US006368114B1

(12) United States Patent
Inoue

(10) Patent No.: US 6,368,114 B1
(45) Date of Patent: Apr. 9, 2002

(54) ELECTRICAL WIRING STRUCTURE FOR SUNVISOR

(75) Inventor: Takuya Inoue, Nagoya (JP)

(73) Assignees: Autonetworks Technologies, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/390,320

(22) Filed: Sep. 7, 1999

(30) Foreign Application Priority Data

Dec. 17, 1998 (JP) ........................................... 10-359551
Dec. 17, 1998 (JP) ........................................... 10-359553

(51) Int. Cl.$^7$ ............................................. F21V 33/00
(52) U.S. Cl. ...................... 439/34; 362/144; 439/248; 439/545; 439/926
(58) Field of Search .................... 439/34, 247, 248, 439/545, 680, 926; 362/144, 142, 494; 296/97.11, 97.5, 97.12

(56) References Cited

U.S. PATENT DOCUMENTS

| 1,157,026 | A | * | 10/1915 | Meschenmoser | ............ | 439/252 |
| 2,983,895 | A | * | 5/1961 | Pasik | ............ | 439/669 |
| 4,174,864 | A | * | 11/1979 | Viertel et al. | ............ | 362/144 |
| 4,472,010 | A | * | 9/1984 | Parnello | ............ | 439/14 |
| 4,720,132 | A | * | 1/1988 | Ebert | ............ | 362/144 |
| 6,059,348 | A | * | 5/2000 | Viertel et al. | ............ | 296/97.9 |
| 6,095,840 | A | * | 8/2000 | Yamaguchi et al. | ............ | 439/34 |
| 6,139,083 | A | * | 10/2000 | Fischer | ............ | 362/144 |
| 6,270,240 | B1 | * | 8/2001 | Inoue | ............ | 362/142 |

FOREIGN PATENT DOCUMENTS

| DE | 3713425 | * | 3/1988 | ............ | 296/47.11 |
| DE | 196 08 566 | * | 4/1997 | | |

* cited by examiner

Primary Examiner—Neil Abrams
(74) Attorney, Agent, or Firm—Oliff & Berridge, PLC

(57) ABSTRACT

An operation for insert-molding bus bars 17 into an L-shape stay 16 to insert a horizontal shaft portion 16a of the stay 16 into a visor holder 5 is performed such that a male terminal portion 17a of the bus bars 17 of the horizontal shaft portion 16a is engaged to a female terminal 18 of a sunvisor-side connector 19. Moreover, an operation for joining a stay holder 22 to a roof panel 1 is performed such that a male terminal portion 17b of the bus bars 17 of a vertical shaft portion 16b is engaged to a female terminal 30 of a car-body-side connector 31.

In another embodiment (FIGS. 11–13), an operation for integrally joining a sunvisor-side connector 19 to a stay holder 22 to join the stay holder 22 to a roof panel 1 is performed such that the sunvisor-side connector 19 is automatically joined to a car-body-side connector 31 floatably held by a connector holder 29 fixed to a car body member 28. The connector 19 may include rotation limiting structure 31b which is to be deactivated by a sleeve 22f on the stay holder 22 when the connectors are mated.

13 Claims, 16 Drawing Sheets

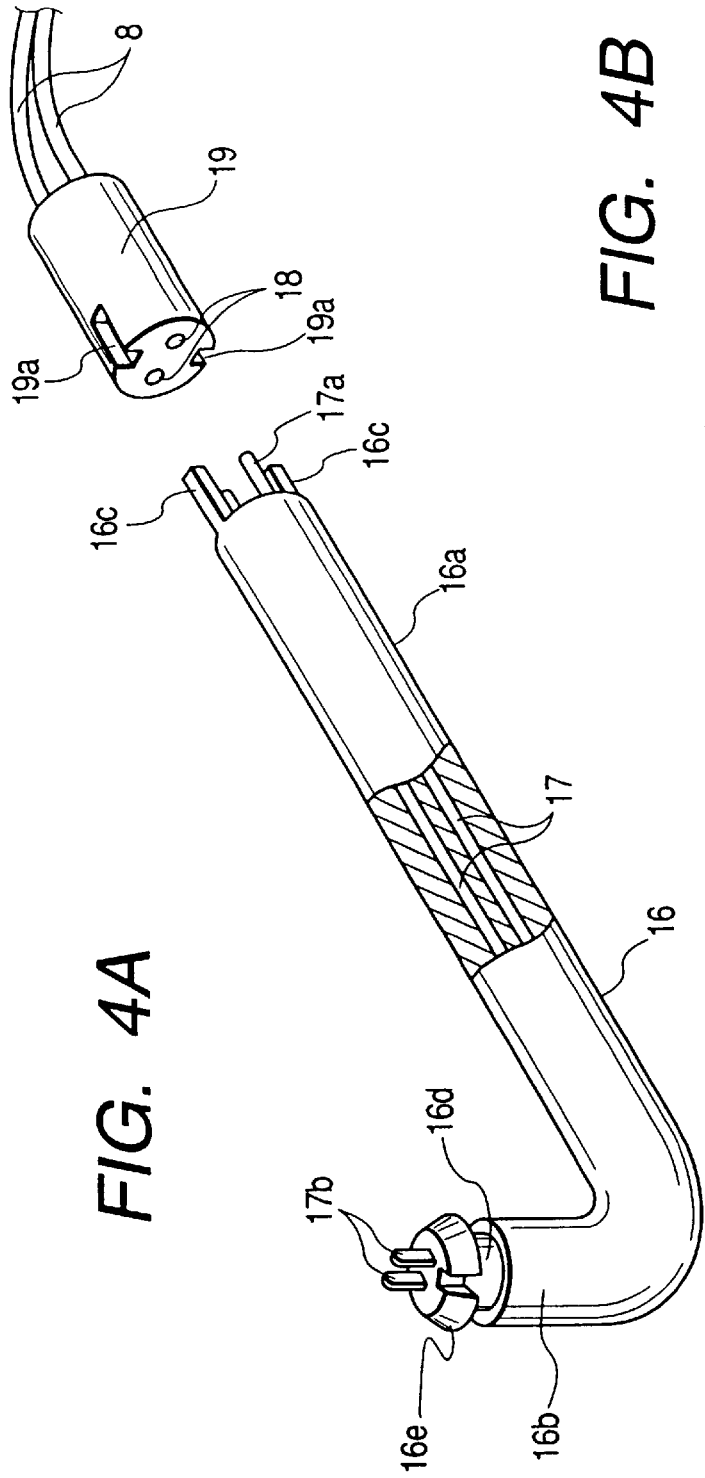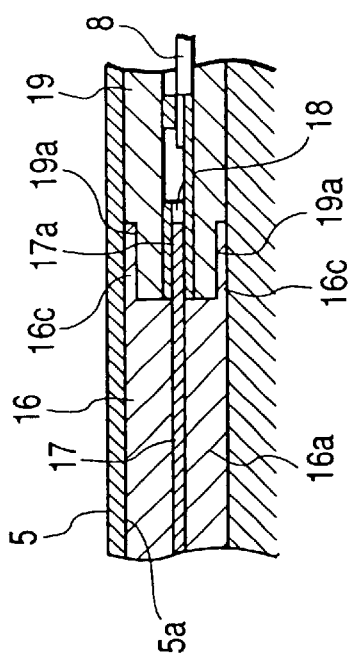
FIG. 4A
FIG. 4B

FIG. 7A
FIG. 7B
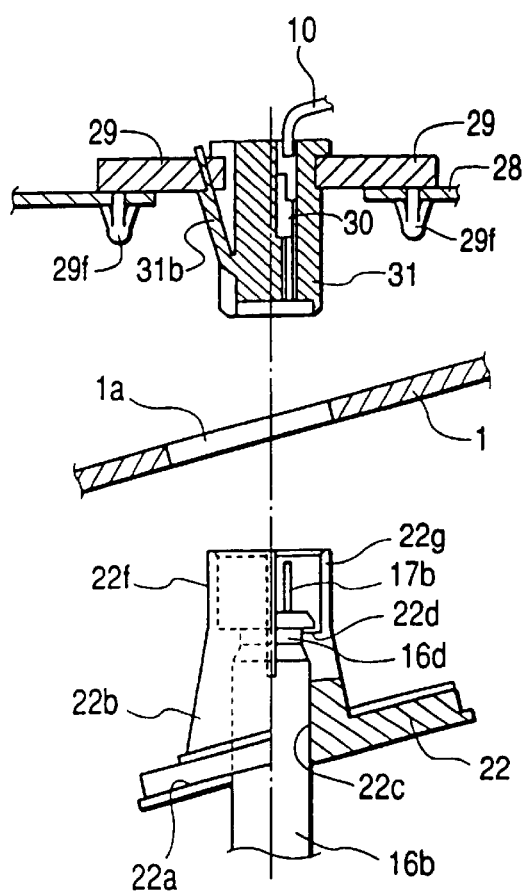
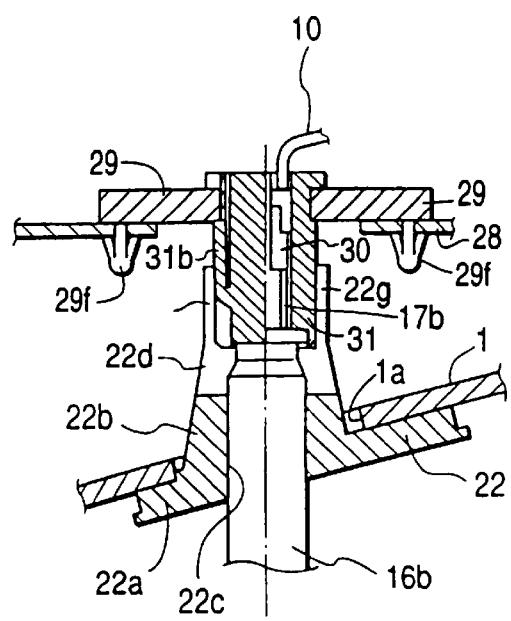

ELECTRICAL WIRING STRUCTURE FOR SUNVISOR

BACKGROUND OF THE INVENTION

The present invention relates to a wiring structure for a sunvisor.

In general, a sunvisor is, as shown in FIGS. 15 and 16, structured such that a horizontal shaft portion 3b of an L-shape pipe stay 3 having a vertical shaft portion 3a supported rotatively around the vertical shaft by a stay holder 2 joined to a roof panel 1 in a vehicle is inserted into a visor holder 5 of a sunvisor body 4. Thus, the sunvisor body 4 is supported may in a rotational direction around a horizontal shaft.

The sunvisor body 4 having a vanity mirror 6 is provided with a vanity lamp 7. When a cover (not shown) of the vanity mirror 6 is opened, a switch is switched on so that the vanity lamp 7 is turned on.

Ends of a pair of electric wires 8 are connected to the vanity lamp 7. The electric wires 8 are allowed to pass through the inside portion of the stay 3. A sunvisor-body-side connector 9 joined to other ends of the electric wires 8 is, in the roof panel 1, connected to a car-body-side connector 11 connected to an electric wire 10 extended from a battery. Thus, the battery in the car body and the vanity lamp 7 of the sunvisor body are electrically connected to each other.

When each rotational movement of the sunvisor body 4 around the horizontal shaft of the stay 3 and lateral movement (when the sunvisor is used ) of the sunvisor body 4 around the vertical shaft is performed, each of the electric wires 8 is twisted to permit the movement of the sunvisor body 4.

An operation for joining the stay holder 2, which supports the stay 3 of the sunvisor body 4, to the roof panel 1 is performed as follows: an operator holds the car-body-side connector 11 by either hand thereof while holding the sunvisor body 4 under the operator's arm in a state in which the car-body-side connector 11 has been drawn into the car body through a joining hole la of the roof panel 1. Then, the sunvisor-body-side connector 9 is held by the other hand so that the sunvisor-body-side connector 9 and the car-body-side connector 11 are connected to each other. Then, the sunvisor-body-side connector 9 and the electric wires 8 are pushed inwards into the inside portion of the roof panel 1 through the joining hole la while the car-body-side connector 11 and the electric wire 10 are being pushed inwards into the inside portion of the roof panel 1 through the joining hole 1a. Then, the stay holder 2 is made contact with the roof panel 1 so as to be secured with screws.

The electric wires 8 of the vanity lamp 7, which must be allowed to pass through the L-shape stay 3, however, require a complicated operation for passing the electric wires. Since the sunvisor-body-side connector 9 must be connected to the other ends of the electric wires 8, also the operation for connecting the sunvisor-body-side connector becomes too complicated.

What is worse, the operator must connect the connectors 9 and 11 by the two hands while holding the sunvisor body 4 under the operator's arm in a state in which the operator faces the roof portion. Therefore, the operation for connecting the connectors is too complicated. Since the electric wires 10 and 8 and the connectors 9 and 11 must be pushed inwards into the inside portion of the roof panel 1 through the joining hole 1a, the operation for joining the sunvisor becomes too complicated. As described above, there arise a variety of problems.

In general, a sunvisor is, shown in FIGS. 15 and 16, structured such that a horizontal shaft portion 3b of an L-shape pipe stay 3 having a vertical shaft portion 3a supported rotatively around the vertical shaft by a stay holder 2 joined to a roof panel 1 in a vehicle is inserted into a visor holder 5 of a sunvisor body 4. Thus, the sunvisor body 4 is supported movably in a rotational direction around a horizontal shaft.

SUMMARY OF THE INVENTION

To solve the foregoing problems experienced with the conventional technique, an object of the present invention is to provide a wiring structure for a sunvisor which is capable of simplifying a variety of operations required to electrically connect a battery in a car body and a vanity lamp of the sunvisor body to each other.

To solve the foregoing problems, according to aspect 1 of the present invention, there is provided a wiring structure for a sunvisor structured such that a horizontal shaft portion of an L-shape stay having a vertical shaft portion supported rotatively around a vertical shaft by a stay holder joined to a roof panel in a vehicle is inserted into a visor holder of a sunvisor body so that the sunvisor body is supported movably in a rotational direction around a horizontal shaft and the sunvisor body is provided with a vanity lamp, the wiring structure for a sunvisor comprising:

a bus bar for electrically connecting the vanity lamp of the sunvisor body and a battery in the car body to each other is insert-molded into the stay, and a male-terminal portion projects over each end of the vertical shaft and the horizontal shaft.

Since the present invention is structured such that the bus bar is insert-molded into the L-shape stay, a necessity for the conventional structure to pass the electric wires of the vanity lamp through the L-shape pipe stay can be eliminated. In the foregoing case, the operation for passing the electric wires can be omitted.

As in aspect 2, a sunvisor-side connector for accommodating a female terminal to which an electric wire of the vanity lamp is connected is joined to the visor holder of the sunvisor body such that rotation of the sunvisor connector around the horizontal shaft is permitted, and the male terminal portion of the horizontal shaft portion is engaged to the female terminal of the sunvisor-side connector when the horizontal shaft portion of the stay is inserted into the visor holder. In the foregoing case, when the operation for inserting the horizontal shaft portion of the stay is inserted into the visor holder is performed, the male terminal portion of the bus bar of the horizontal shaft portion can automatically be engaged to the female terminal of the sunvisor-side connector. Therefore, the operation for connecting the connectors can be omitted. When the sunvisor body is rotationally moved around the horizontal shaft, the sunvisor-side connector is rotated around the horizontal shaft. Thus, the rotational movement of the sunvisor body is permitted.

As in aspect 3, a car-body-side connector for accommodating the male terminal to which an electric wire of the battery is connected is joined to a car-body member in the roof panel such that rotation of the car-body-side connector around the vertical shaft is permitted, and the male terminal portion of the vertical shaft portion is engaged to the female terminal of the car-body-side connector when the stay holder which supports the vertical shaft portion of the stay is joined to the roof panel. In the foregoing case, when the operation for joining the stay holder, which supports the vertical shaft portion of the stay, to the roof panel is performed, the male terminal portion of the bus bar of the vertical shaft portion can automatically be joined to the female terminal of the car-body-side connector. Therefore, the operation for connecting the connectors can be omitted. As for the longitudinal movement of the sunvisor body around the vertical shaft, rotation of the car-body-side connector around the vertical shaft permits the longitudinal movement of the sunvisor body.

As in aspect 4, a register recess is formed in an end surface of the sunvisor-side connector, a register projection longer than the male terminal portion and projecting over the male terminal portion is formed on end surface of the horizontal shaft portion of the stay, and the register projection is engaged to the register recess when the horizontal shaft portion is inserted into the visor holder. Therefore, the male terminal portion of the horizontal shaft portion of the stay can smoothly be engaged to the female terminal of the sunvisor-side connector. Since the register projection is longer than the male terminal portion to project over the male terminal portion, the register projection serves as a guard to prevent undesirable breakage of the male terminal portion which has not been engaged.

As in aspect 5, a sleeve portion which has a length which is substantially the same as that of the male terminal is formed at each end surface of the vertical shaft portion and into which the car-body-side connector is inserted is provided for the stay holder for supporting the vertical shaft portion of the stay, and an axial-directional slit is formed in the sleeve portion. Since the sleeve portion has the length which is substantially the same as that of the male terminal portion, the sleeve portion serves as a guard to prevent undesirable breakage of the male terminal portion before the male terminal portion has not been engaged. Since the axial-directional slit is formed in the sleeve portion to have elasticity in the direction perpendicular to the axial direction, insertion of the car-body-side connector can smoothly be performed.

As in aspect 6, either of the register projection or register recess is provided for the end surface of the car-body-side connector, a residual one of the register projection or the register recess is provided for the end surface of the vertical shaft portion of the stay, and the register projection and the register recess are engaged to each other when the stay holder, which supports the vertical shaft portion, is joined to the roof panel. In the foregoing case, the male terminal portion of the vertical shaft portion can smoothly be engaged to the female terminal of the car-body-side connector.

As in aspect 7, the car-body member is provided with a connector holder which permits insertion and joining of the car-body-side connector from a direction perpendicular to the axial direction, and displacement of the car-body-side insertion portion of the connector holder in the direction perpendicular to the axial direction is permitted. In the foregoing case, the car-body-side connector can be joined to the connector holder which is the car-body member by a one-touch operation. Since the insertion portion permits displacement of the car-body-side connector in the direction perpendicular to the axial direction, an error from the male terminal portion of the vertical shaft portion of the stay occurring due to an assembling operation can be absorbed. As a result, the male terminal portion of the vertical shaft portion of the stay can smoothly be engaged.

As in aspect 8, an insertion portion is provided for the car-body member, and the connector holder is inserted and joined to the insertion portion. In the foregoing case, the connector holder and the car-body-side connector can be joined to the car-body member by a one-touch operation.

As in aspect 9, a slit is formed in the car-body-side-connector insertion portion of the connector holder, a rotation-stopping projection made contact with two side surface of the slit and arranged to stop rotation of the car-body-side connector at a connector joining position is formed on the side portion of the car-body-side connector, and the rotation-stopping projection is embedded such that the rotation-stopping projection is not made contact with the two side surfaces of the slit when the car-body-side connector has been inserted into the sleeve portion of the stay holder. In the foregoing case, unintentional rotation of the car-body-side connector around the vertical shaft before the engagement of the male terminal portion of the vertical shaft portion is engaged to the female terminal of the car-body-side connector can be prevented. Therefore, the male terminal portion of the vertical shaft portion of the stay can smoothly be engaged.

As in aspect 10, the slit also serves as an inserting slit for inserting the car-body-side connector into the car-body-side insertion portion. In the foregoing case, the car-body-side connector can easily and quickly be inserted into the connector holder.

Further, according to aspect 11 of the present invention, there is provided a wiring structure for a sunvisor structured such that a horizontal shaft portion of an L-shape stay having a vertical shaft portion supported rotatively around a vertical shaft by a stay holder joined to a roof panel in a vehicle is inserted into a visor holder of a sunvisor body so that the sunvisor body is supported movably in a rotational direction around a horizontal shaft and structured such that the sunvisor body is provided with a vanity lamp and an electric wire of the vanity lamp is passed through the stay so as to be connected to an electric wire extended from a battery on the car body, the sunvisor comprising:

a sunvisor-side connector integrally provided for the stay holder and arranged to accommodate a terminal to which the electric wire of the vanity lamp is connected; and a car-body-side connector joined to a car-body member in the roof panel and arranged to accommodate a terminal to which the electric wire extended from the battery is connected, wherein when the stay holder which supports the vertical shaft portion of the stay is joined to the roof panel, the sunvisor-side connector is joined to the car-body-side connector.

The present invention is structured such that the sunvisor-side connector is integrally joined to the stay holder. The necessity of holding the sunvisor-side connector by the hand can be eliminated. Moreover, an operation for joining the stay holder to the roof panel can be performed such that the sunvisor-side connector is automatically joined to the car-body-side connector. Thus, the operation for connecting the connectors can be omitted.

As in aspect 12, the car-body member is provided with a connector holder which is capable of inserting the car-body-side connector from the axial direction to join the car-body-side connector such that rotation of the car-body-side connector is inhibited, and an insertion portion of the connector holder can be displaced in a direction perpendicular to the axial direction. In the foregoing case, the car-body-side connector can be joined to the connector holder of the car-body member by a one-touch operation. Moreover, the insertion portion permits displacement of the car-body-side connector in the direction perpendicular to the axial direction. Therefore, an error or the like from the sunvisor-side connector occurring when assembly is performed can be absorbed. Therefore, the sunvisor-side connector can smoothly be joined.

As in aspect 13, an insertion portion is provided for the car-body member, and the connector holder is inserted and joined to the insertion portion. In the foregoing case, the connector holder and the car-body-side connector can be joined to the car-body member by a one-touch operation.

BRIEF DESCRIPTION OF THE DRAWINGS

FIGS. 4A and 4B show a stay and a sunvisor-side connector, in which FIG. 4A is a perspective view; and FIG. 4B is a cross sectional view showing a joined state.

FIGS. 7A and 7B show a male terminal of the stay and the car-body-side connector, in which FIG. 7A is a side cross sectional view showing a state before joining; and FIG. 7B is a side cross sectional view showing a state when joining has been performed.

FIGS. 8A and 8B show a connector holder, in which FIG. 8A is a perspective view; and FIG. 8B is a perspective view showing a state in which the connector holder has been joined to the car-body member.

FIGS. 10A and 10B show a connector holder, in which FIG. 10A is a perspective view; and FIG. 10B is a perspective view showing a state in which the car-body-side connector has been joined.

DETAILED DESCRIPTION OF THE PREFERRED EMBODIMENTS

Figure 1:
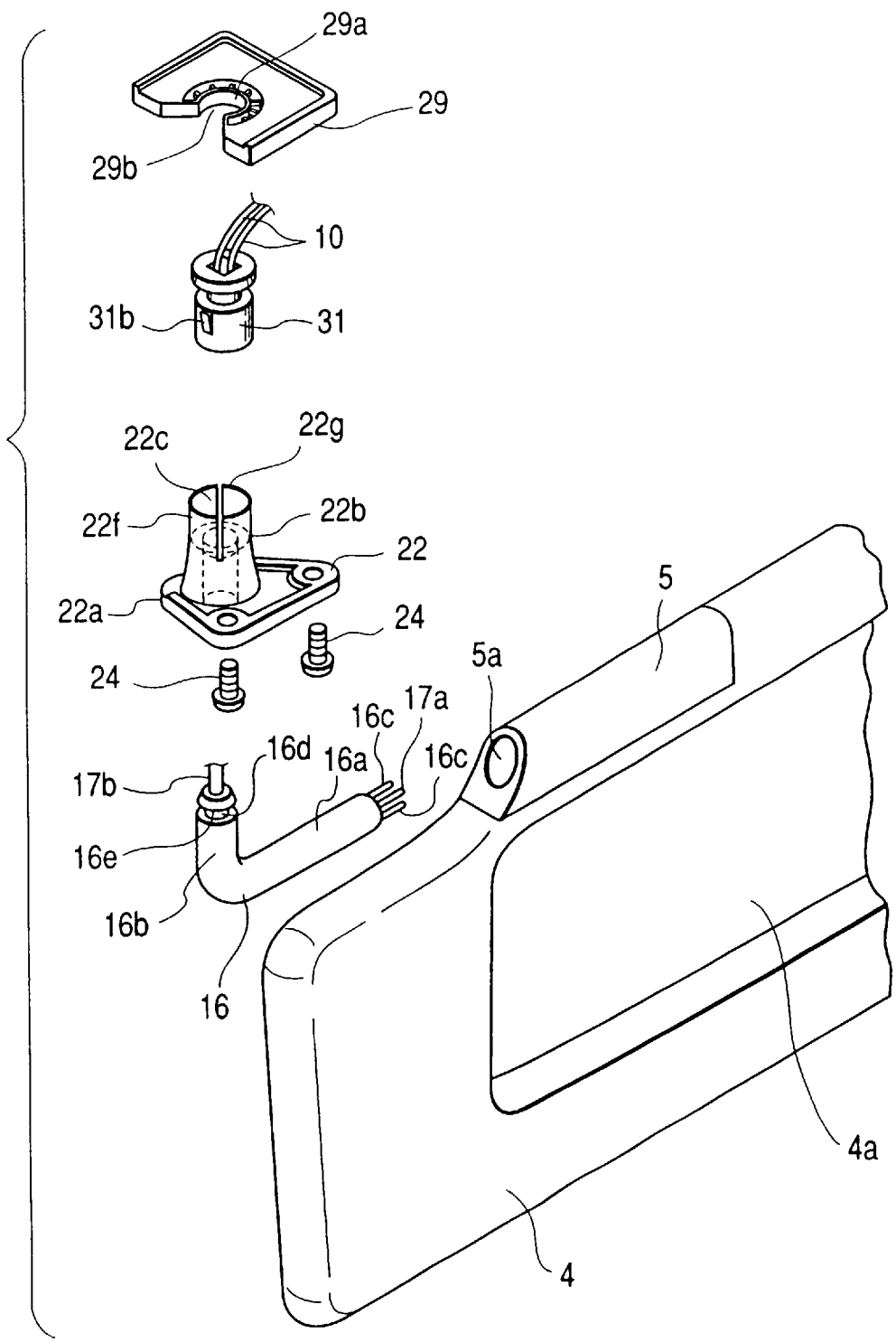
FIG. 1 is an exploded perspective view showing a sunvisor according to the present invention.

An embodiment of the present invention will now be described with reference to the drawings. The same elements as those of the conventional technique are given the same reference numerals and the same elements are omitted from description.

Figure 2:
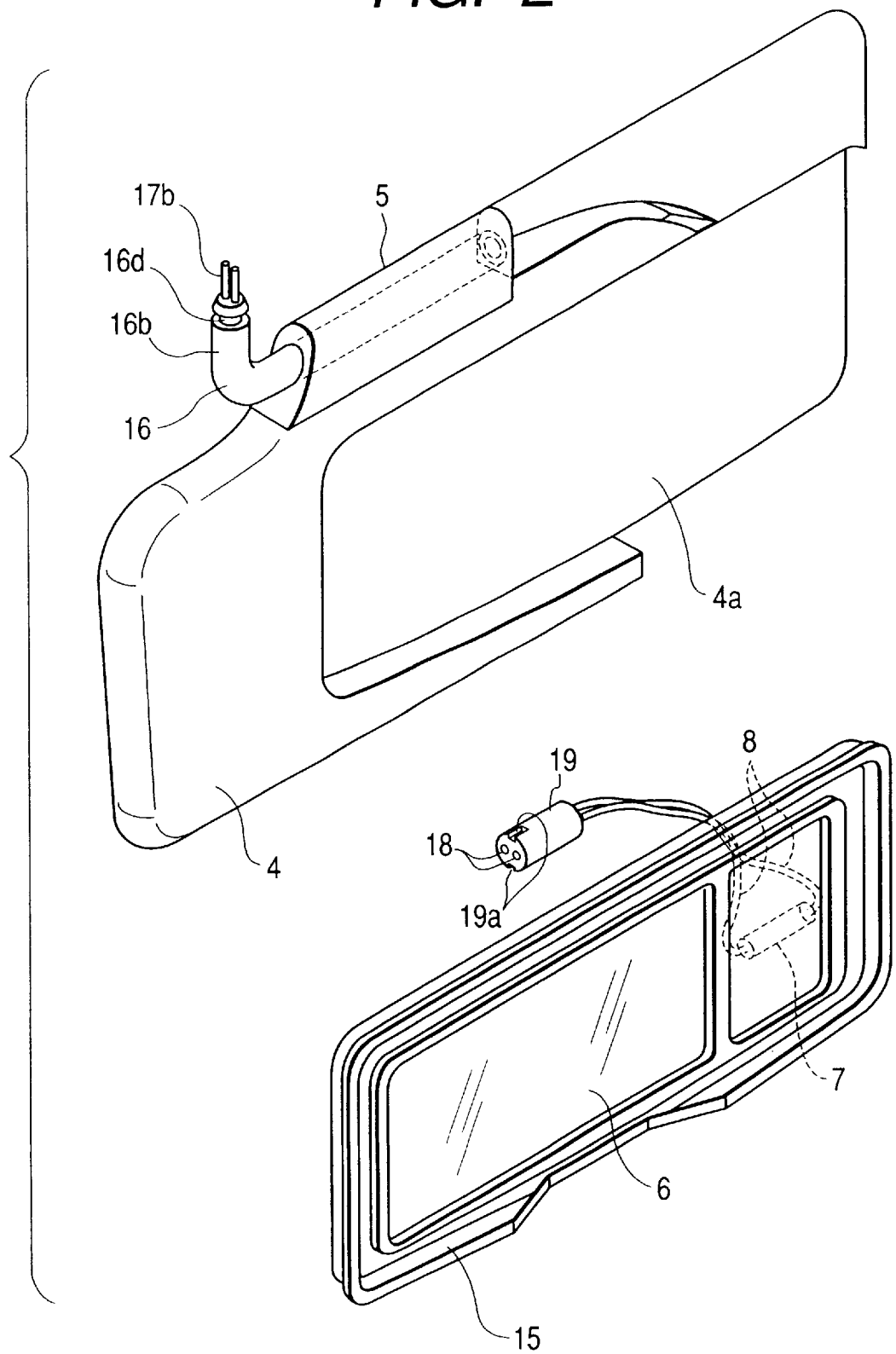
FIG. 2 is an exploded perspective view showing a sunvisor body and a frame.
Figure 3:
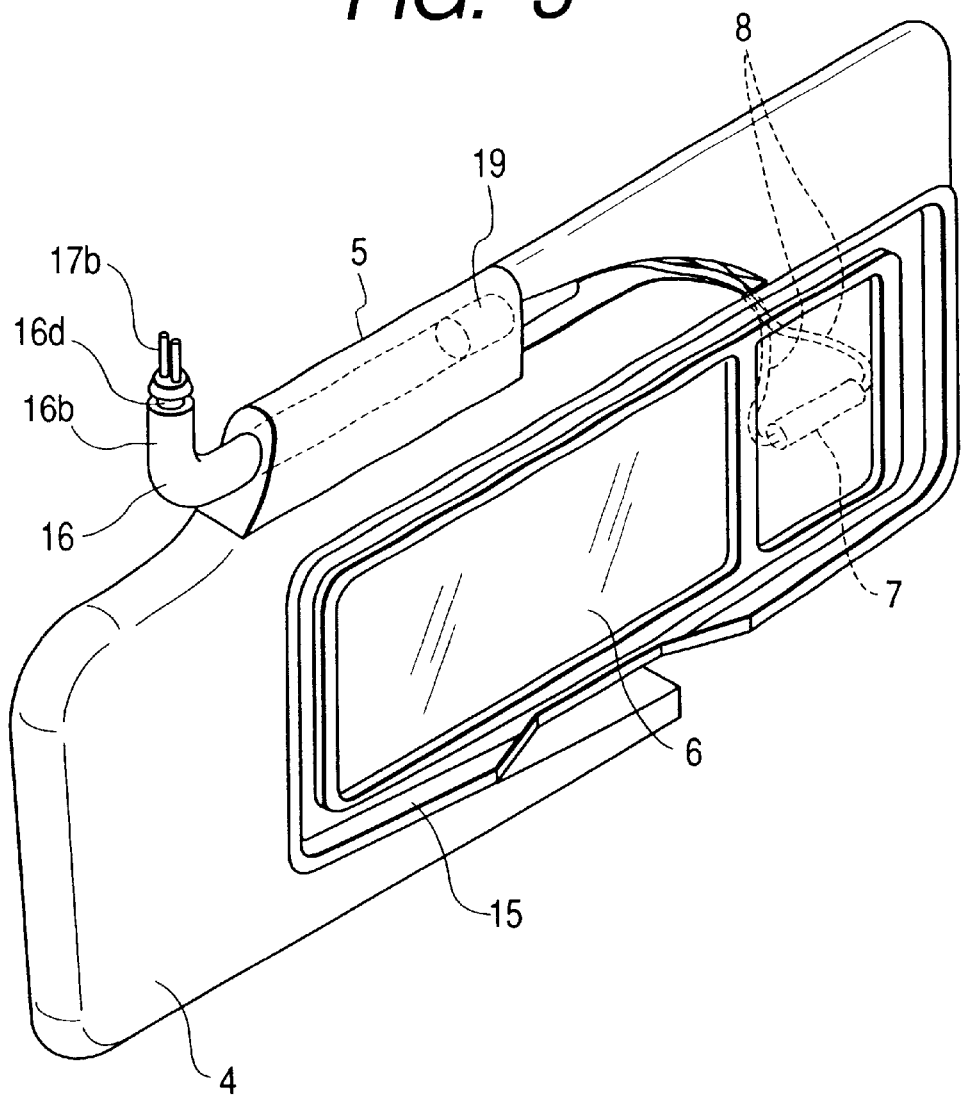
FIG. 3 is a perspective view showing the sunvisor body to which the frame has been joined.
Figure 16:
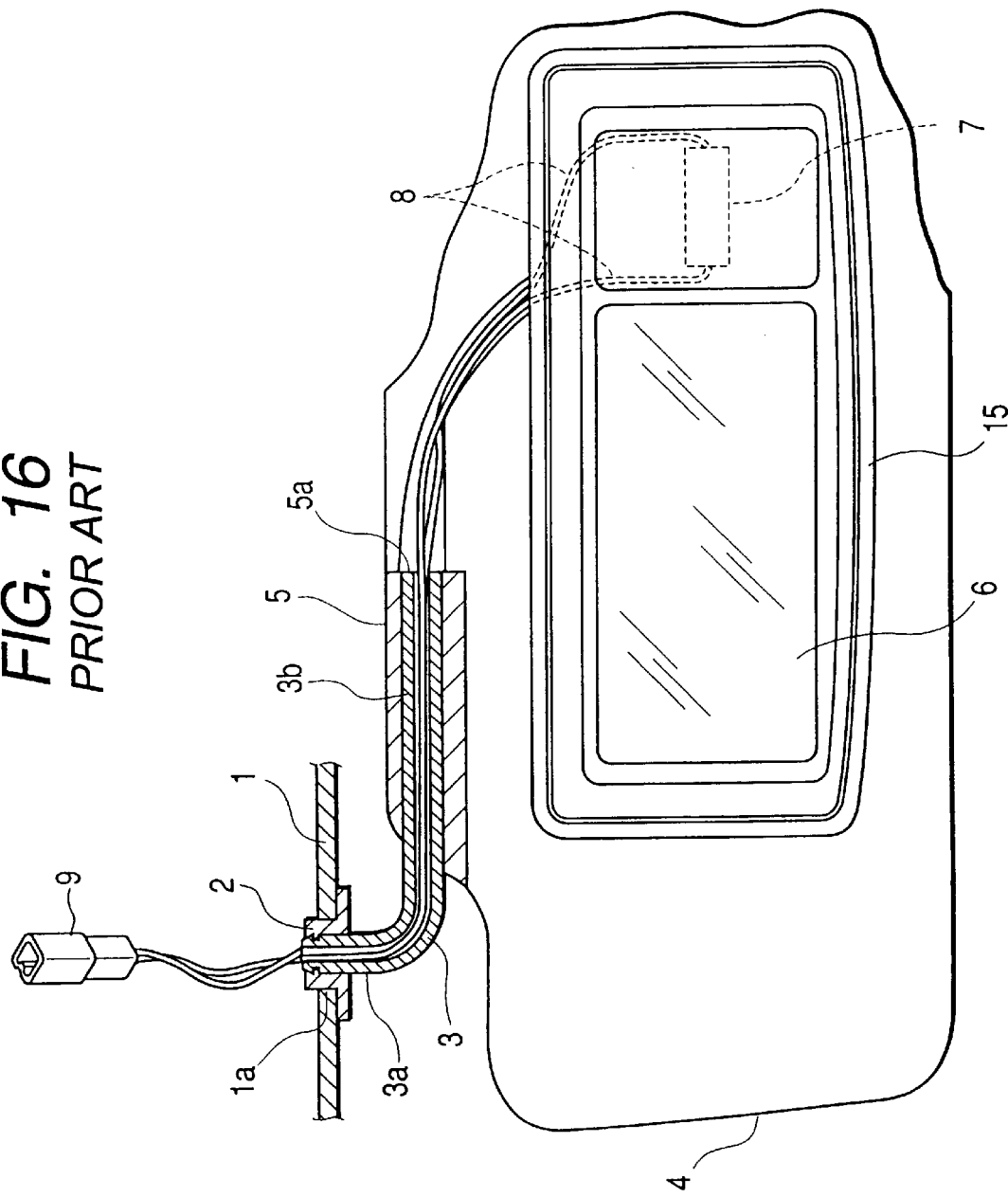
FIG. 16 is a front cross sectional view showing an essential portion of the conventional sunvisor.

As shown in FIGS. 1 to 3, the sunvisor incorporates a sunvisor body 4 formed into a rectangular-plate-like shape elongated in a lateral direction. The sunvisor body 4 is made of, for example, styrofoam. A recess 4a for securing a frame 15 (shown in FIG. 16) having a vanity mirror 6 and a vanity lamp 7 is formed in the front surface of the sunvisor body 4. A visor holder 5 having an insertion hole 5a for the stay 16 to be described later is joined to an upper portion of the sunvisor body 4. Note that a cover (not shown) is provided for the frame 15. When the cover has been opened, a switch is switched on so that the vanity lamp 7 is turned on. Note that the sunvisor body 4 is covered with an outer skin.

The L-shape stay 16 incorporates a horizontal shaft 16a and a vertical shaft 16b. The horizontal shaft portion 16a of the stay 16 is inserted into the insertion hole 5a of the visor holder 5. Thus, the sunvisor body 4 is supported such that rotational movement of the sunvisor body 4 around the horizontal shaft is permitted. When the stay 16 has been inserted into the insertion hole 5a of the visor holder 5 to a predetermined depth, the vanity mirror 6 is locked by a lock spring or the like to prevent undesirable separation.

As shown in FIG. 4 in detail, a pair of bus bars 17 are insert-molded into the stay 16. Each of the male terminal portion 17a and 17b of the bus bars 17 projects over ends of the horizontal shaft portion 16a and the vertical shaft portion 16b for a predetermined length.

A cylindrical sunvisor-side connector 19 for accommodating the female terminal 18, to which the electric wires 8 of the vanity lamp 7 is connected, is inserted into the deep portion of the insertion hole 5a of the visor holder 5 such that rotation of the sunvisor-side connector 19 around the horizontal shaft is permitted. Similarly to the stay 16, the sunvisor-side connector 19 is locked by a lock spring or the like at a predetermined position of the insertion hole 5a to prevent separation.

When the horizontal shaft portion 16a of the stay 16 is inserted into the insertion hole 5a of the visor holder 5, the male terminal portion 17a of the horizontal shaft portion 16a is automatically engaged to the female terminal 18 of the sunvisor-side connector 19. As for the rotational movement of the sunvisor body 4 around the horizontal shaft, the sunvisor-side connector 19 which is able to rotate around the horizontal shaft permits the rotational movement of the sunvisor body 4. The rotation of the sunvisor-side connector 19 is absorbed because the electric wires 8 are twisted.

Two register recesses 19a are formed in an end surface of the sunvisor-side connector 19. Moreover, two register projections 16c which are longer than the male terminal portion 17a and allowed to project over the male terminal portion 17a are formed on the end surface of the register projections 16a of the stay 16. When the register projections 16a are inserted into the insertion hole 5a, the register projections 16a are engaged to the register recesses 19a of the sunvisor-side connector 19.

Figure 5:
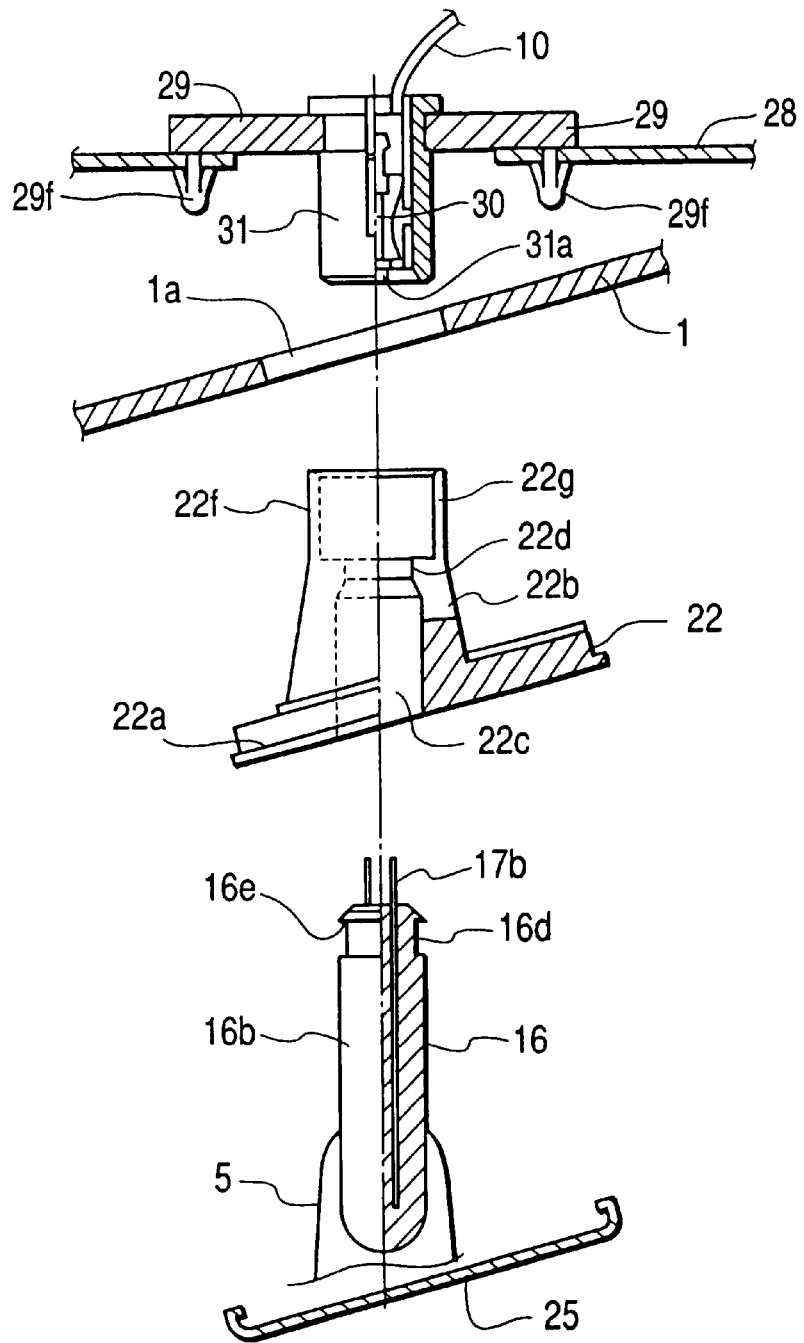
FIG. 5 is an exploded side view showing the stay, a stay holder and a car-body-side connector.
Figure 6:
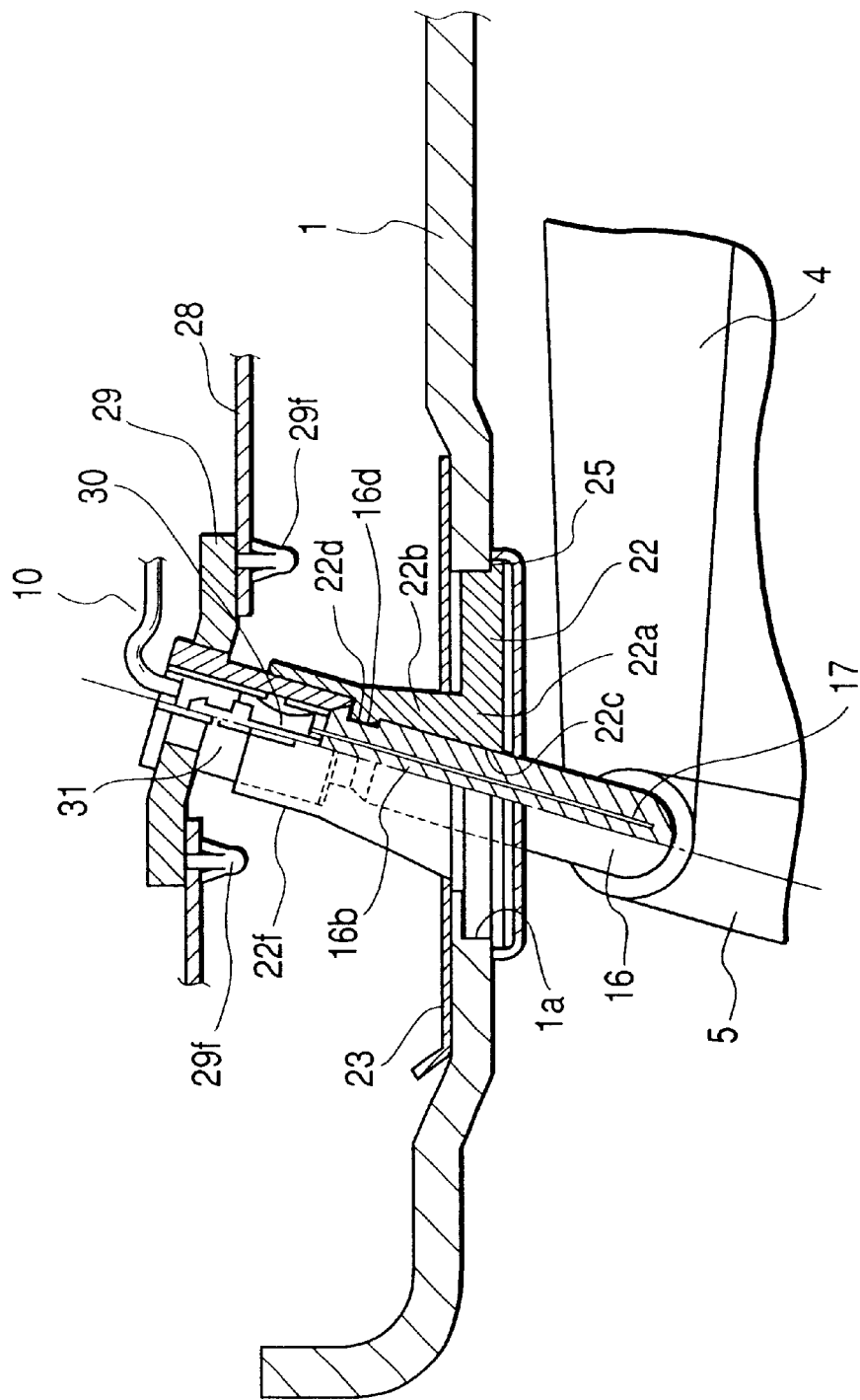
FIG. 6 is a side view showing an assembled state of the stay, the stay holder and the car-body-side connector.

As shown in FIGS. 1, 5 and 6, a stay holder 22 which is joined to the roof panel 1 in the cabin incorporates a flange portion 22a which is made contact with the lower surface of the roof panel 1 and a holder portion 22b which is inserted into the joining hole 1a of the roof panel 1. The flange portion 22a is secured to the roof panel 1 with screws 24 by using screw washers 23 (see FIG. 6) made contact with the upper surface of the roof panel 1. Note that the flange portion 22a is covered with a cover 25.

An insertion hole 22c, into which the vertical shaft portion 16b of the stay 16 is inserted rotatively around the vertical shaft, is formed in the lower portion of the holder portion 22b of the stay holder 22. An engaging projection 22d for securing an outer groove 16d of the vertical shaft portion 16b when the vertical shaft portion 16b has been inserted to a predetermined depth is formed in the upper portion of the insertion hole 22c. Thus, the vertical shaft portion 16b is locked so that removal of the vertical shaft portion 16b from the insertion hole 22c is prevented. When the vertical shaft portion 16b of the stay 16 has been inserted into the insertion hole 22c, the sunvisor body 4 is supported such that the lateral movement (when the sunvisor is used) of the sunvisor body 4 around the vertical shaft is permitted.

A thin sleeve portion 22f having the length which is substantially the same as that of the male terminal 17b projecting over the end surface of the vertical shaft portion 16b of the stay 16 is formed in an upper portion of the holder portion 22b of the stay holder 22. The sleeve portion 22f has four slits 22g formed at the same intervals in the circumferential direction of the sleeve portion 22f so that elasticity is imparted to the sleeve portion 22f.

A car-body-side connector 31 for accommodating a female terminal 30 to which the electric wire 10 extended from a mounted battery is connected is joined to a connector holder 29 joined to a car body member 28 in the roof panel 1 such that rotation of the car-body-side connector 31 around the vertical shaft is permitted. When the stay holder 22, which supports the vertical shaft portion 16b of the stay 16, is joined to the roof panel 1, the male terminal portion 17b of the vertical shaft portion 16b of the stay 16 is automatically engaged to the female terminal 30 of the car-body-side connector 31 while the sleeve portion 22f is being inserted into the car-body-side connector 31. As for longitudinal movement of the sunvisor body 4 around the vertical shaft, the car-body-side connector 31, which is capable of rotating around the vertical shaft, permits the longitudinal movement of the sunvisor body 4. The rotation of the car-body-side connector 31 can be absorbed when the electric wire 10 is twisted.

Two register projections 31a are formed on the end surface of the car-body-side connector 31. Register recesses 16e are formed in the end surface of the vertical shaft portion 16b of the stay 16. When the stay holder 22, which supports the vertical shaft portion 16b, is joined to the roof panel 1, the register projections 31a and the register recesses 16e are engaged to one another.

Figure 8A:
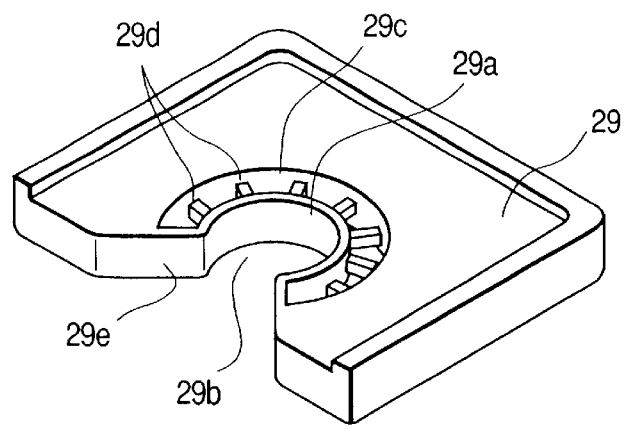
Figure 8B:
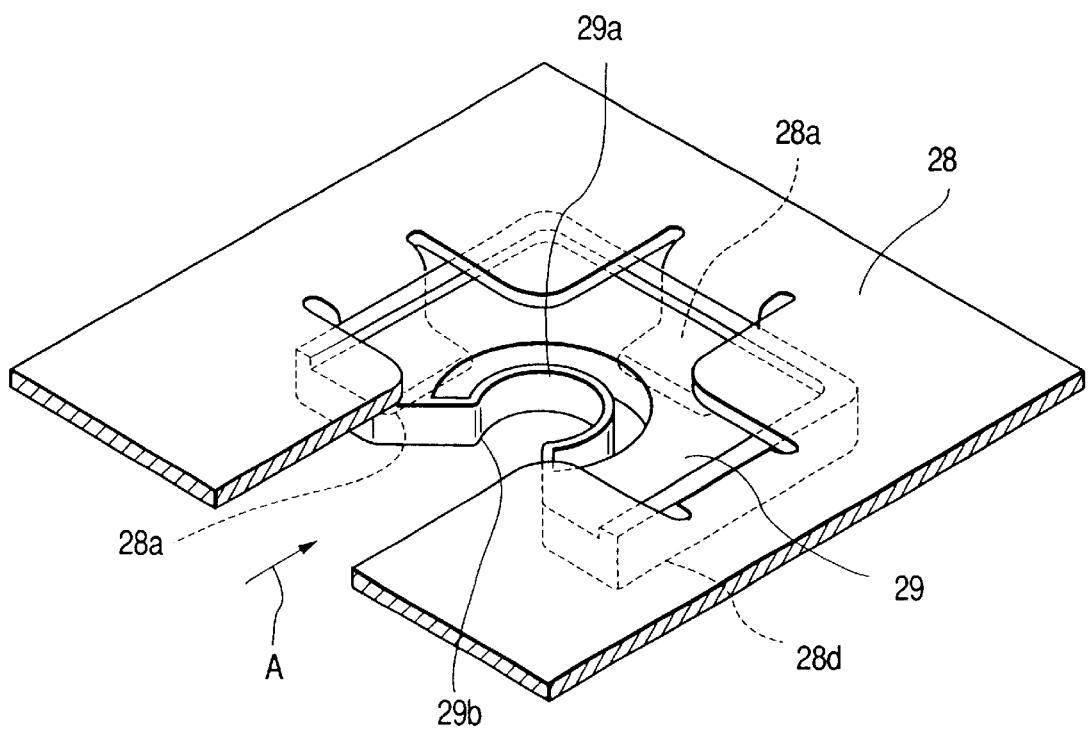

As shown in FIG. 8 in detail, the connector holder 29 has a cylindrical insertion hole portion 29a into which the car-body-side connector 31 is inserted. The insertion hole portion 29a has an outward-opened slit 29b into which the car-body-side connector 31 is inserted from a direction (from a side position) perpendicular to the axial direction. A semi-circular cut portions 29c are formed around the insertion hole portion 29a. The cut portions 29c are connected by a plurality of thin bridge portions 29d so that slight displacement of the insertion hole portion 29a in the direction perpendicular to the axial direction is permitted.

The car-body member 28 has an insertion portion 28a formed by cutting upwards the three sides and by inwardly bending the leading ends of the three sides. The connector holder 29 is inserted through one of the portions of the insertion portion 28a (see an arrow A shown in FIG. 8B). Note that the connector holder 29 may be joined to the car-body member 28 with a snap portion 29f, as shown in FIG. 6.

As shown in FIG. 7a, rotation-stopping projection 31b projecting over the outer surface of the car-body-side connector 31 is formed on the side portion of the car-body-side connector 31. The rotation-stopping projection 31b is brought into contact with the two side surfaces 29e of the outward-opened slit 29b of the connector holder 29 (Shown in FIG. 8A). Thus, undesirable rotation of the car-body-side connector 31 is stopped at the connector joining position. As shown in FIG. 7B, when the car-body-side connector 31 has been inserted into the sleeve portion 22f of the stay holder 22, the car-body-side connector 31 is inserted into the sleeve portion 22f more inwards than the outer surface. Thus, contact with the two side surfaces 29e of the outward-opened slit 29b (Shown in FIG. 8A) can be prevented.

Figure 9A:
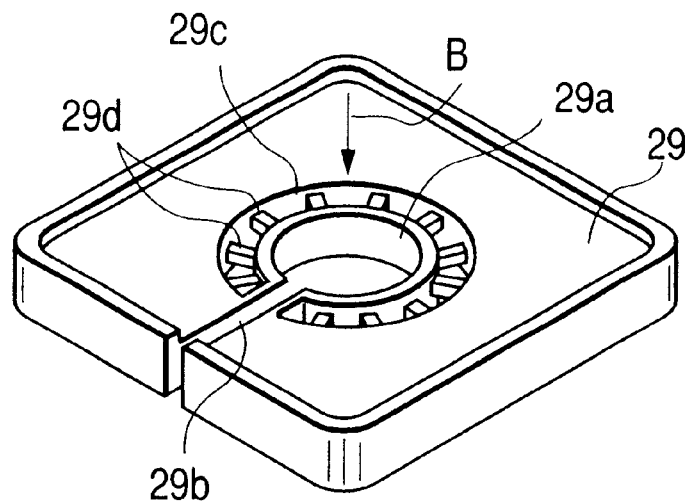
FIGS. 9A and 9B are perspective views showing a modification of the connector holder.
Figure 9B:
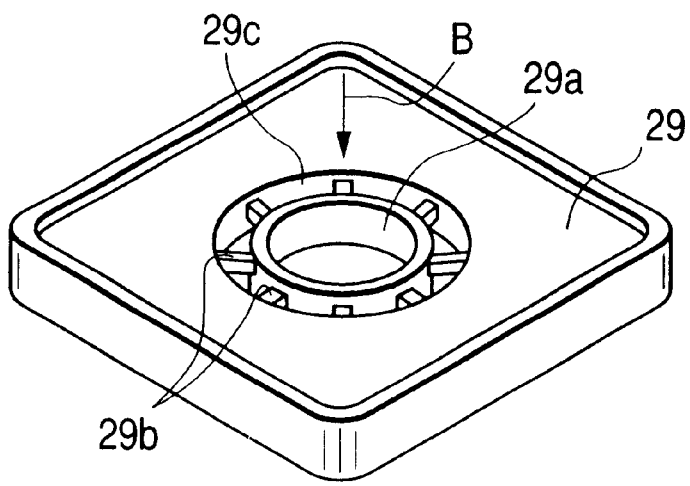
Figure 10A:
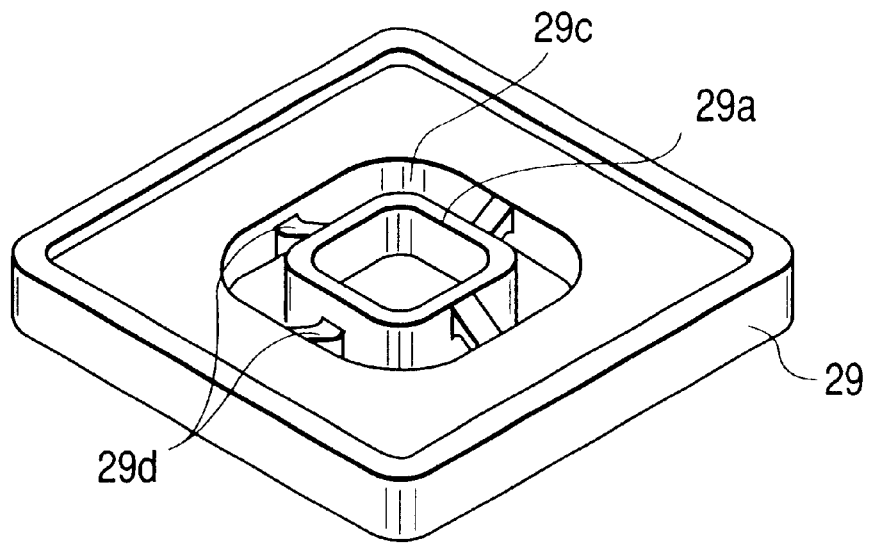
Figure 10B:
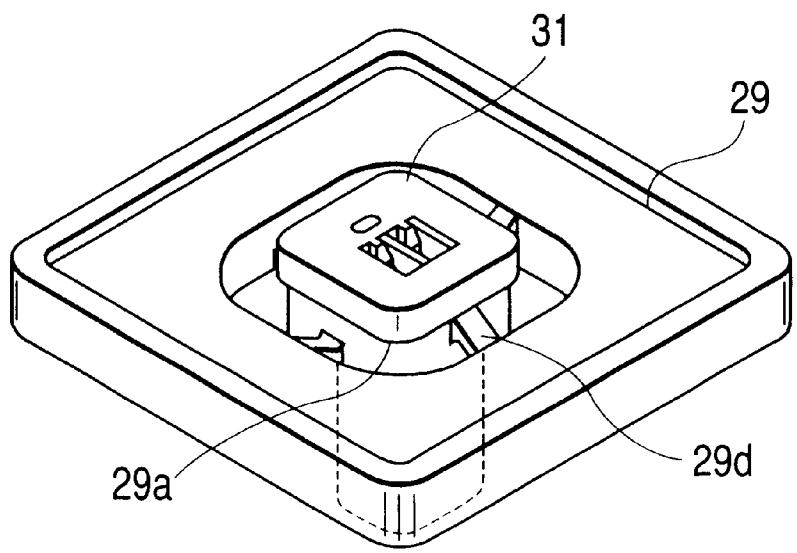
Figure 11:
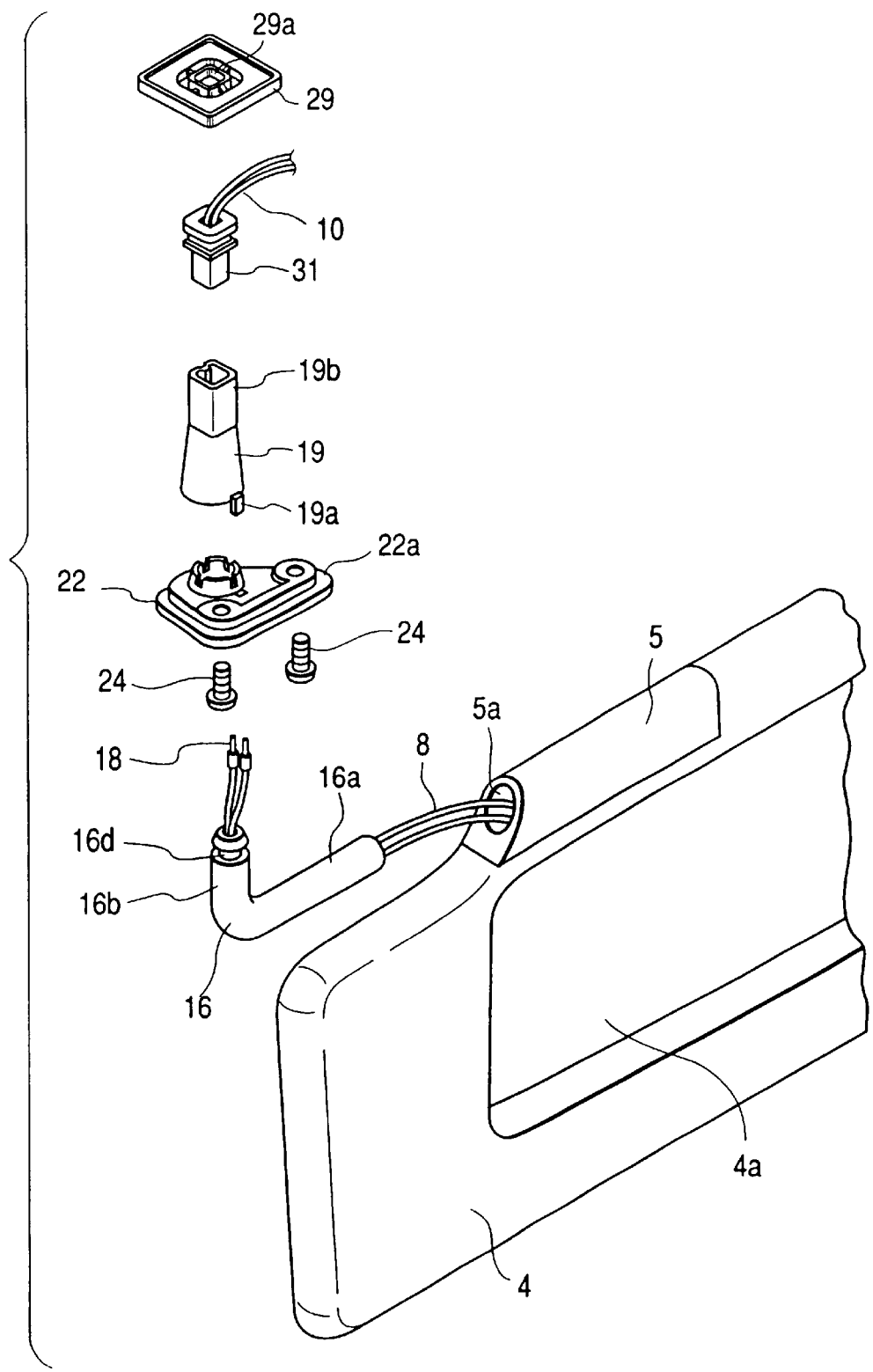
FIG. 11 is an exploded perspective view showing a sunvisor according to the second embodiment of the present invention.

The outward-opened slit 29b of the connector holder 29 also serves an insertion slit for inserting the car-body-side connector 31 into the insertion hole portion 29a from the direction perpendicular to the axial direction. In a case of a structure as shown in FIG. 9A in which the car-body-side connector 31 is inserted into the insertion hole portion 29a from axial direction B, the outward-opened shape is not required. When the rotation of the car-body-side connector 31 is not required to be stopped as shown in FIG. 9B, the slit 29b may be omitted. In a case where the car-body-side connector 31 is not required to be rotated in the insertion hole portion 29a of the connector holder 29 as shown in FIG. 10, the insertion hole portion 29a may be formed into a rectangular shape as a substitute for the cylindrical shape. In this case, a rectangular car-body-side connector 31 is inserted into the insertion hole portion 29a from the axial direction.

Since the foregoing structure is arranged such that the bus bars 17 is insert-molded in the stay 16, the necessity of passing the electric wires 8 of the vanity lamp 7 through the L-shape stay 16 can be eliminated. Therefore, the operation required for the conventional technique to pass the electric wire can be omitted. When an operation for inserting the register projections 16a of the stay 16 into the insertion hole 5a of the visor holder 5 is performed, the male terminal portion 17a of the bus bars 17 of the register projections 16a can automatically be engaged to the female terminal 18 of the sunvisor-side connector 19. Therefore, the operation required for the conventional technique to connect the connectors can be omitted.

The register recesses 19a is formed in the sunvisor-side connector 19, the register projections 16c is formed in the horizontal shaft portion 16a of the stay 16 and the register projections 16c is engaged to the register recesses 19a when the horizontal shaft portion 16a is inserted into the insertion hole 5a of the visor holder 5. Therefore, the male terminal portion 17a of the horizontal shaft portion 16a of the stay 16 can smoothly be inserted into the female terminal 18 of the sunvisor-side connector 19. Since the register projections 16c is longer than the male terminal portion 17a and formed to project over the male terminal portion 17a, the register projections 16c serve as guards to prevent unintentional breakage of the male terminal portion 17a which has not been engaged.

The car-body-side connector 31 is joined to the car body member 28 in the roof panel 1. Therefore, the operation for joining the stay holder 22 to the roof panel 1 can be performed such that the male terminal portion 17b of the bus bars 17 of the vertical shaft portion 16b of the stay 16 is automatically engaged to the female terminal 30 of the car-body-side connector 31. Therefore, the operation required for the conventional technique to connect the connectors can be omitted. The stay holder 22, which supports the vertical shaft portion 16b of the stay 16, is provided with the sleeve portion 22f having the length which is substantially the same as that of the male terminal portion 17b of the vertical shaft portion 16b. Therefore, the sleeve portion 22f serves as a guard to prevent unintentional breakage of the male terminal portion 17b which has not been engaged. Since the axial-directional 22g is formed in the sleeve portion 22f, insertion of the car-body-side connector 31 can smoothly be performed.

The register projection 31a is formed on the car-body-side connector 31. The register recesses 16e is formed in the vertical shaft portion 16b of the stay 16. Therefore, when the stay holder 22, which supports the vertical shaft portion 16b, is joined to the roof panel 1, the register recesses 16e is engaged to the register projections 31a. Therefore, the male terminal portion 17b of the vertical shaft portion 16b of the stay 16 can smoothly be engaged to the female terminal 30 of the car-body-side connector 31.

The car-body-side connector 31 is inserted into the insertion hole portion 29a of the connector holder 29 provided for the car body member 28. Therefore, the car-body-side connector 31 can be joined to the connector holder 29 by a one-touch operation. Since the car-body-side connector 31 can be displaced in the direction perpendicular to the axial direction owing to the insertion hole portion 29a, an error from the male terminal portion 17a of the vertical shaft portion 16b of the stay 16 occurring when assembly is performed can be absorbed. As a result, the male terminal portion 17b of the vertical shaft portion 16b of the stay 16 can smoothly be engaged.

When the connector holder 29 is simply inserted into the insertion portion 28a of the car body member 28, the connector holder 29 and the car-body-side connector 31 can be joined by the one-touch operation.

The rotation-stopping projection 31b of the car-body-side connector 31 is brought into contact with the two side surfaces 29e of the outward-opened slit 29b of the insertion hole portion 29a of the connector holder 29. Therefore, unintentional rotation of the car-body-side connector 31 around the vertical shaft can be prevented before the male terminal portion 17b of the vertical shaft portion 16b of the stay 16 is engaged to the female terminal 30 of the car-body-side connector 31. Therefore, the male terminal portion 17b of the vertical shaft portion 16b of the stay 16 can smoothly be engaged. The outward-opened slit 29b also serves as the insertion slit for inserting the car-body-side connector 31 into the insertion hole portion 29a from the direction perpendicular to the axial direction. Therefore, the car-body-side connector 31 can easily and quickly be inserted into the connector holder 29.

As described above, the various operations for electrically connecting the battery mounted on the car body and the vanity lamp 7 of the sunvisor body 4 to each other can be simplified.

As can be understood from the foregoing description, the wiring structure for a sunvisor according to the present invention has the structure that the bus bar is insert-molded into the L-shape stay. Therefore, the necessity of passing the electric wire of the vanity lamp through the L-shape stay can be eliminated. Therefore, the operation for passing the electric wire can be omitted.

The sunvisor-side connector is joined to the visor holder of the sunvisor body (aspect 2). Therefore, the operation for inserting the horizontal shaft portion into the visor holder can be performed such that the male terminal portion of the bus bar of the horizontal shaft portion is automatically engaged to the female terminal of the sunvisor-side connector. Therefore, the operation for connecting the connectors can be omitted.

The car-body-side connector is joined to the car-body member in the roof panel (aspect 3). Therefore, the operation for joining the stay holder to the roof panel can be performed such that the male terminal of the bus bar of the vertical shaft portion is automatically engaged to the female terminal of the car-body-side connector. Therefore, the operation for connecting the connectors can be omitted.

The register recesses are formed in the sunvisor-side connector and the register projection is formed on the horizontal shaft portion (aspect 4). Therefore, the male terminal portion of the horizontal shaft portion of the stay can smoothly be engaged to the female terminal of the sunvisor-side connector. The register projection is longer than the male terminal portion to project over the male terminal portion. Therefore, the register projection serves as the guard to prevent unintentional breakage of the male terminal portion before the male terminal portion is engaged.

The sleeve portion having the length substantially the same as that of the male terminal portion of the vertical shaft portion of the stay is provided for the stay holder (aspect 5). Therefore, the sleeve portion serves as a guard for preventing unintentional breakage of the male terminal portion which has not been engaged. Since the axial-directional slit is formed in the sleeve portion, insertion of the car-body-side connector can smoothly be performed.

Either of the register projection or the register recess is provided for the car-body-side connector and the other one of the register projection or the register recess is provided for the vertical shaft portion of the stay (aspect 6). Therefore, the male terminal portion of the vertical shaft portion can smoothly be inserted into the female terminal of the car-body-side connector.

The connector holder having the insertion portion which can be displaced in the direction perpendicular to the axial direction is provided for the car-body member (aspect 7). Therefore, the car-body-side connector can be joined to the connector holder of the car-body member by the one-touch operation. Therefore, an error from the male terminal portion of the vertical shaft portion of the stay occurring when assembly is performed can be absorbed. Thus, the male terminal portion of the vertical shaft portion of the stay can smoothly be joined.

The connector holder is inserted and joined to the insertion portion of the car-body member (aspect 8). Therefore, the connector holder and the car-body-side connector can be joined to the car-body member by the one-touch operation.

The slit is formed in the insertion portion of the connector holder and the rotation-stopping projection is formed on the car-body-side connector (aspect 9). Therefore, unintentional rotation of the car-body-side connector around the vertical shaft can be prevented before the male terminal portion of the vertical shaft portion of the stay is engaged to the female terminal of the car-body-side connector. Therefore, the male terminal portion of the vertical shaft portion of the stay can smoothly be engaged.

The slit also serves as the insertion slit for inserting the car-body-side connector into the car-body-side-connector insertion portion from the direction perpendicular to the axial direction (aspect 10). Therefore, the car-body-side connector can easily and quickly be inserted into the connector holder.

The stay 16 is constituted by a pipe member. Similar to the conventional structure, a pair of electric wires 8 having ends connected to the vanity lamp 7 are passed through the stay 16. A male terminal 18 is connected to other ends of the electric wires 8 extended from the vertical shaft portion 16b of the stay 16.

Figure 12:
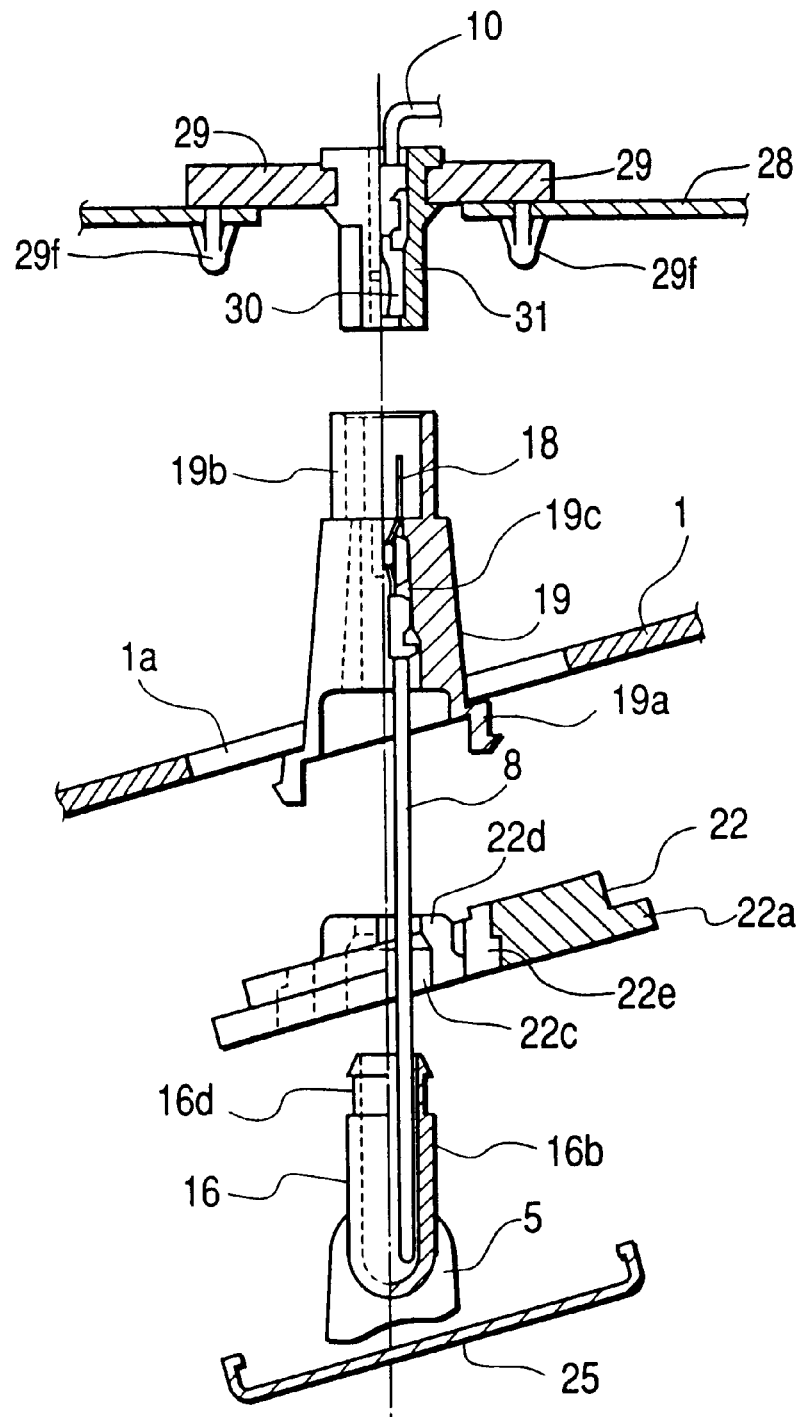
FIG. 12 is an exploded side view showing a stay, a stay holder, a sunvisor-side connector and a car-body-side connector according to the second embodiment of the present invention.
Figure 13:
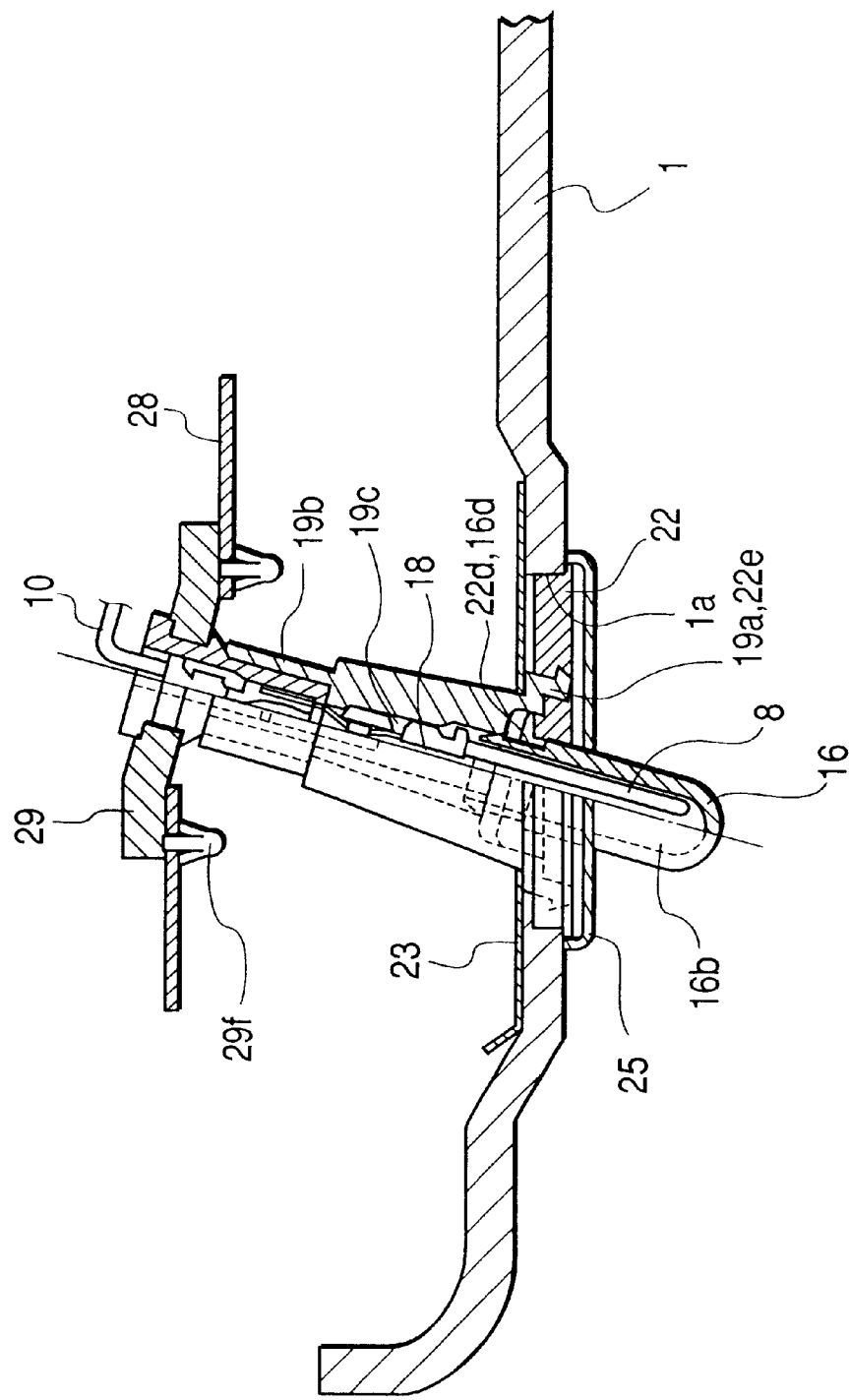
FIG. 13 is a side view showing an assembled state of the stay, the stay holder, the sunvisor-side connector and the car-body-side connector of the second embodiment of the present invention.

As shown in FIGS. 12 and 13, a stay holder 22 which is joined to the roof panel 1 in the cabin incorporates a flange portion 22a which is made contact with the lower surface of the roof panel 1, an insertion hole 22c into which the vertical shaft portion 16b of the stay 16 is inserted such that rotation of the vertical shaft portion 16b around the vertical shaft is permitted and an engaging recess 22e to which a sunvisor-side connector 19 to be described later is engaged. An engaging projection 22d for engaging an outer groove 16d of the vertical shaft portion 16b when the vertical shaft portion 16b has been inserted into a predetermined depth is formed in the upper portion of the insertion hole 22c. Thus, the vertical shaft portion 16b is locked in such a manner that removal of the vertical shaft portion 16b from the insertion hole 22c is prevented. Since the vertical shaft portion 16b of the stay 16 is inserted into the insertion hole 22c, the sunvisor body 4 is supported such that lateral movement (when the sunvisor is used) around the vertical shaft is permitted.

An engaging claw 19a which is engaged to the engaging recess 22e of the stay holder 22 from an upper position so as to be integrated with the stay holder 22 is formed in the lower portion of the sunvisor-side connector 19. Moreover, a hood portion 19b into a car-body-side connector 31 to be described later is formed in the upper portion of the sunvisor-side connector 19.

A cavity 19c for accommodating the female terminal 18 at another end of the electric wires 8 extended from the vertical shaft portion 16b of the stay 16 is formed in the sunvisor-side connector 19.

The flange portion 22a of the stay holder 22 is secured to the roof panel 1 with screws 24 by using a screw washer 23 made contact with the upper surface of the roof panel 1 in a state in which the sunvisor-side connector 19 has been engaged. Note that the flange portion 22a is covered with a cover 25.

The car-body-side connector 31 formed into a rectangular shape and arranged to accommodate a female terminal 30 to which the electric wire 10 extended from a battery mounted on the vehicle is connected is joined to a connector holder 29 joined to a car body member 28 in the roof panel 1. When the stay holder 22, which supports the vertical shaft portion 16b of the stay 16 is joined to the roof panel 1, the female terminal portion 18 is automatically engaged to the female terminal 30 of the car-body-side connector 31 while the hood portion 19c of the sunvisor-side connector 19 is being inserted into the car-body-side connector 31. Note that the vertical movement of the sunvisor body 4 around the horizontal shaft and the longitudinal movement of the same around the vertical shaft are absorbed because the electric wires 8 are twisted.

As shown in FIG. 10 in detail, the connector holder 29 has an insertion hole portion 29a formed into a rectangular shape to receive the car-body-side connector 31 from the axial direction. Cut portions 29c are formed around the insertion hole portion 29a. The cut portions 29c are connected to one another by a plurality of thin-width bridge portion 29d so that slight displacement of the insertion hole portion 29a in the direction perpendicular to the axial direction is permitted.

Figure 14:
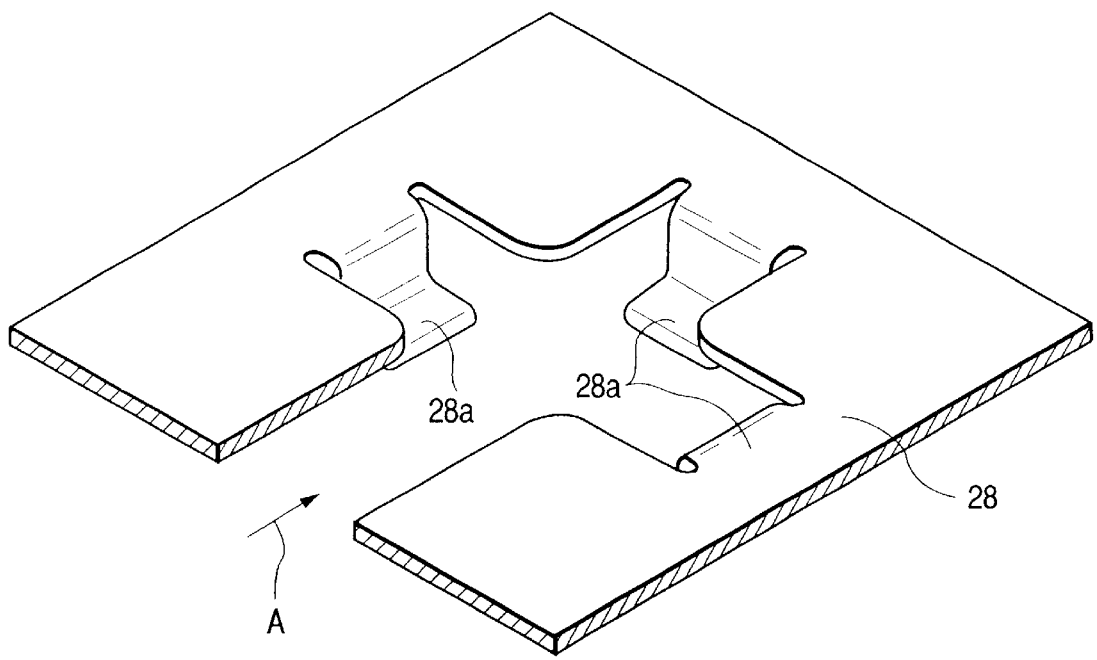
FIG. 14 is a perspective view showing an insertion portion of the car-body member.
Figure 15:
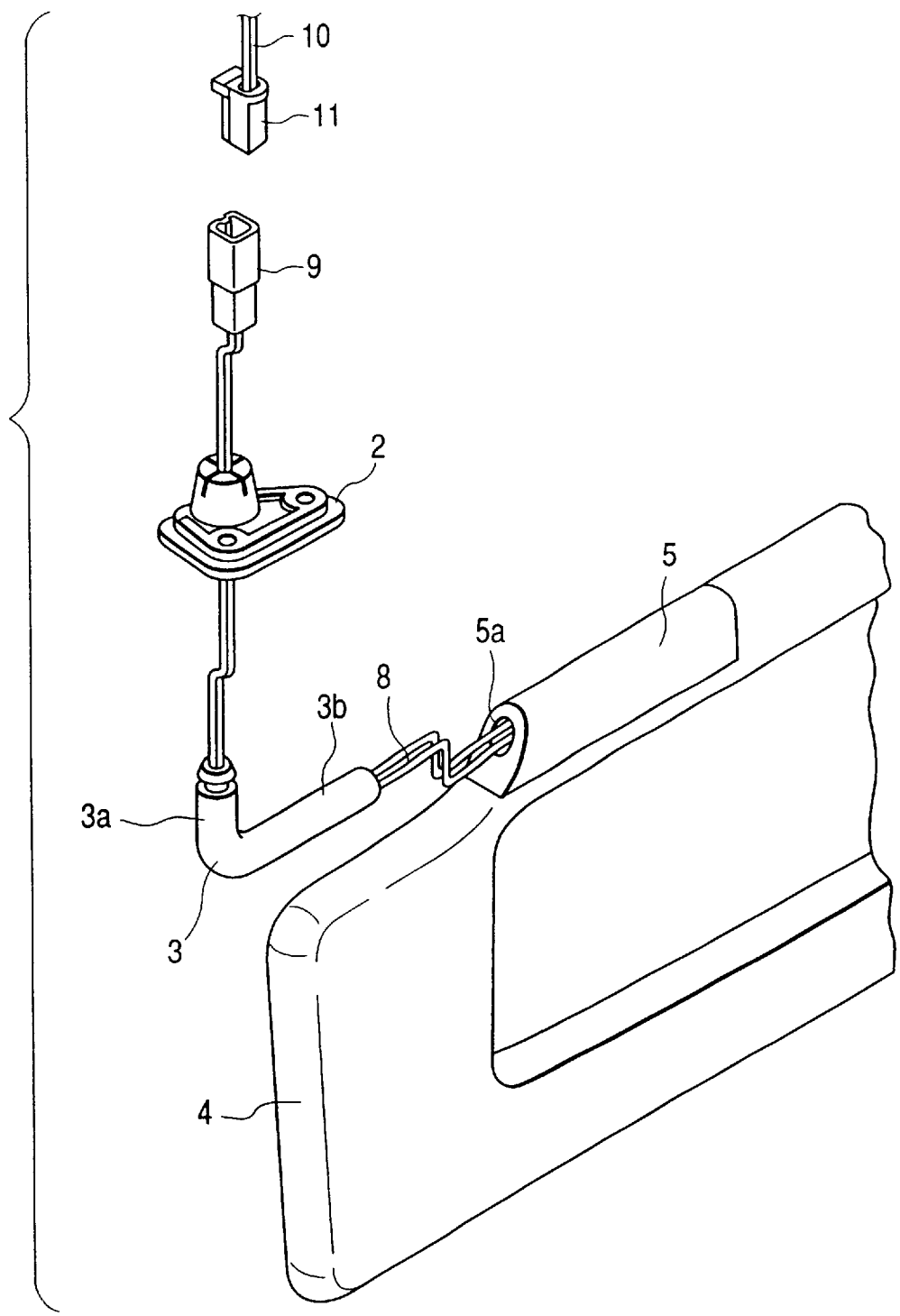
FIG. 15 is an explode perspective view showing a conventional sunvisor.

As shown in FIG. 14, the car-body member 28 has an insertion portion 28a formed by cutting upwards the three sides and by inwardly bending the leading ends of the three sides. The connector holder 29 is inserted and joined from any one of the portions of the insertion portion 28a. Note that the connector holder 29 may be joined to the car body member 28 with a snap portion 29f, as shown in FIG. 13.

The foregoing structure is arranged such that the sunvisor-side connector 19 is integrally engaged and joined to the stay holder 22. The necessity of holding the sunvisor-side connector 19 with the hands can be eliminated. Moreover, the operation for joining the stay holder 22 to the roof panel 1 can be performed such that the sunvisor-side connector 19 is automatically joined to the car-body-side connector 31. Therefore, the operation for connecting the connectors can be omitted.

The car-body-side connector 31 is simply inserted into the connector holder 29 of the car body member 28 so that joining is performed by a one-touch operation. Since the insertion portion 29a permits displacement of the car-body-side connector 31 in the direction perpendicular to the axial direction, an error from the sunvisor-side connector 19 occurring when assembly is performed can be absorbed. Therefore, the sunvisor-side connector 19 can smoothly be joined.

When the connector holder 29 and the car-body-side connector 31 are simply inserted into the insertion portion 28a of the car body member 28, joining can be performed by a one-touch operation.

Thus, the various operations for establishing the electrical connection between the battery mounted on the car body and the vanity lamp 7 of the sunvisor body 4 can be simplified.

As can be understood from the foregoing description, the wiring structure for a sunvisor according to the present invention is arranged such that the sunvisor-side connector is integrally joined to the stay holder. Thus, the necessity of holding the sunvisor-side connector with the hands can be eliminated. Moreover, the operation for joining the stay holder to the roof panel can be performed such that the sunvisor-side connector is automatically joined to the car-body-side connector. As a result, the operation for connecting the connectors can be omitted.

The connector holder for receiving and joining the car-body-side connector from the axial direction is provided for the car-body member (aspect 12). Therefore, the car-body-side connector can be joined to the connector holder of the car-body member by a one-touch operation. Moreover, the insertion portion permits displacement of the car-body-side connector in the direction perpendicular to the axial direction. Therefore, an error or the like from the sunvisor-side connector occurring when assembly is performed can be absorbed. Thus, the sunvisor-side connector can smoothly be joined.

The connector holder is inserted and joined to the insertion portion of the car-body member (aspect 13). The connector holder and the car-body-side connector can be joined to the car-body member by a one-touch operation.

What is claimed is:

1. A wiring structure for a sunvisor structured such that a horizontal shaft portion of an L-shape stay having a vertical shaft portion supported rotatively around the vertical shaft by a stay holder joined to a roof panel in a vehicle is inserted into a visor holder of a sunvisor body so that said sunvisor body is supported movably in a rotational direction around the horizontal shaft portion and said sunvisor body is provided with a vanity lamp, said wiring structure for a sunvisor comprising:
a bus bar for electrically connecting said vanity lamp of said sunvisor body and a battery in the car body to each other, said wiring structure being insert-molded into said stay, and a male-terminal portion projecting from the ends of said vertical shaft portion and said horizontal shaft portion, wherein a car-body-side connector for accommodating said male terminal to which an electric wire of said battery is connected and is joined to a car-body member in said roof panel such that rotation of said car-body-side connector around the vertical shaft is permitted, and the male terminal portion of the vertical shaft portion is engaged to the female terminal of said car-body-side connector when said stay holder which supports the vertical shaft portion of said stay is joined to said roof panel.

2. The wiring structure for a sunvisor according to claim 1, wherein a sunvisor-side connector for accommodating a female terminal to which an electric wire of said vanity lamp is connected is joined to said visor holder of said sunvisor body such that rotation of said sunvisor connector around the horizontal shaft is permitted, and the male terminal portion of the horizontal shaft portion is engaged to said female terminal of said sunvisor-side connector when the horizontal shaft portion of said stay is inserted into said visor holder.

3. The wiring structure for a sunvisor according to claim 2, wherein a register recess is formed in an end surface of said sunvisor-side connector, a register projection longer than said male terminal portion and projecting over said male terminal portion is formed on end surface of said horizontal shaft portion of said stay, and said register projection is engaged to said register recess when said horizontal shaft portion is inserted into said visor holder.

4. The wiring structure for a sunvisor according to claim 1, wherein a register recess is formed in an end surface of said car-body-side connector, a register projection longer than said male terminal portion and projecting over said male terminal portion is formed on an end surface of said horizontal shaft portion of said stay, and said register projection is engaged to said register recess when said horizontal shaft portion is inserted into said visor holder.

5. The wiring structure for a sunvisor according to claim 1, wherein a sleeve portion which has a length which is substantially the same as that of said male terminal is formed at the end surface of said vertical shaft portion and into which said car-body-side connector is inserted is provided for said stay holder for supporting said vertical shaft portion of said stay, and an axial-dierectional slit is formed in said sleeve portion.

6. The wiring structure for a sunvisor according to claim 3, wherein either of said register projection or register recess is provided for the end surface of said car-body-side connector, a residual one of said register projection or said register recess is provided for the end surface of said vertical shaft portion of said stay, and said register projection and said register recess are engaged to each other when said stay holder, which supports said vertical shaft portion, is joined to said roof panel.

7. The wiring structure for a sunvisor according to claim 1, wherein said car-body member is provided with a connector holder which permits insertion and joining of said car-body-side connector to the connector holder from a direction perpendicular to an axial direction, and displacement of said car-body-side connector in an insertion portion of said connector holder in the direction perpendicular to the axial direction is permitted.

8. The wiring structure for a sunvisor according to claim 7, wherein said connector holder is inserted and joined to an insertion portion of said car-body member.

9. The wiring structure for a sunvisor according to claim 7, wherein a slit is formed in said car-body-side-connector insertion portion of said connector holder, a rotation-stopping projection made contact with two side surface of said slit and arranged to stop rotation of said car-body-side connector at a connector joining position is formed on the side portion of said car-body-side connector, and said rotation-stopping projection is embedded such that said rotation-stopping projection is not made contact with the two side surfaces of said slit when said car-body-side connector has been inserted into said sleeve portion of said stay holder.

10. The wiring structure for a sunvisor according to claim 9, wherein said slit also serves as an inserting slit for inserting said car-body-side connector into said car-body-side insertion portion.

11. A wiring structure for a sunvisor structured such that a horizontal shaft portion of an L-shape stay having a vertical shaft portion supported rotatively around the vertical shaft by a stay holder joined to a roof panel in a vehicle is inserted into a visor holder of a sunvisor body so that said sunvisor body is supported movably in a rotational direction around a horizontal shaft and structured such that said sunvisor body is provided with a vanity lamp and an electric wire of said vanity lamp is passed through said stay so as to be connected to an electric wire extended from a battery on the car body, said wiring structure comprising:

a sunvisor-side connector provided for said stay holder and arranged to accommodate a terminal to which the electric wire of said vanity lamp is connected; and a car-body-side connector is joined to a car-body-member in said roof panel and arranged to accommodate a terminal to which the electric wire extended from said battery is connected, wherein when said stay holder which supports the vertical shaft portion of said stay is joined to said roof panel, said sunvisor-side connector is joined to said car-body-side connector.

12. The wiring structure of a sunvisor according to claim 11, wherein said car-body member is provided with a connector holder which is capable of inserting said car-body-side connector from an axial direction to join said car-body-side connector such that rotation of said car-body-side connector is inhibited, and an insertion portion of said connector holder can be displaced in a direction perpendicular to the axial direction.

13. The wiring structure for a sunvisor according to claim 12, wherein said connector holder is inserted and joined to said insertion portion of said car-body member.

* * * * *